(12) United States Patent
Noll et al.

(10) Patent No.: US 9,737,886 B2
(45) Date of Patent: Aug. 22, 2017

(54) METHOD AND DEVICE FOR PRODUCING SHELL CATALYSTS

(71) Applicant: THYSSENKRUPP INDUSTRIAL SOLUTIONS AG, Essen (DE)

(72) Inventors: Oliver Noll, Castrop-Rauxel (DE); Guido Walther, Leverkusen (DE); Sigrid Evert, Zossen (DE); Andreas Martin, Berlin (DE)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 0 days.

(21) Appl. No.: 14/785,629

(22) PCT Filed: Apr. 15, 2014

(86) PCT No.: PCT/EP2014/001005
§ 371 (c)(1),
(2) Date: Oct. 19, 2015

(87) PCT Pub. No.: WO2014/170012
PCT Pub. Date: Oct. 23, 2014

(65) Prior Publication Data
US 2016/0074854 A1 Mar. 17, 2016

(30) Foreign Application Priority Data
Apr. 19, 2013 (DE) .......... 10 2013 006 794

(51) Int. Cl.
*B01J 37/02* (2006.01)
*B01J 35/00* (2006.01)
(Continued)

(52) U.S. Cl.
CPC ......... *B01J 37/0201* (2013.01); *B01J 35/008* (2013.01); *B01J 37/0054* (2013.01);
(Continued)

(58) Field of Classification Search
CPC   B01J 37/0201; B01J 37/0209; B01J 37/0211; B01J 37/0223; B01J 37/0054;
(Continued)

(56) References Cited

U.S. PATENT DOCUMENTS 4,255,285 A    3/1981  Engelbach et al.
4,854,981 A *  8/1989  Goodson ................ B01J 23/745
                                                          149/109.6

(Continued)

FOREIGN PATENT DOCUMENTS

CN          1033641 A        7/1989
CN          1519057 A        8/2004
(Continued)

OTHER PUBLICATIONS

German language International Search Report for International patent application No. PCT/EP2014/001005; mailing date Jul. 16, 2014.

(Continued)

*Primary Examiner* — Patricia L Hailey
(74) *Attorney, Agent, or Firm* — thyssenkrupp North America, Inc.

(57) ABSTRACT

Disclosed herein is a process and an apparatus for producing coated catalysts. A process of the present disclosure includes providing a composition containing a liquid and a catalytically active material and/or a precursor thereof in a stock vessel, providing a support material in a vessel which is rotatable about a longitudinal axis, transporting the composition from the stock vessel through a first conduit to a spray nozzle, transporting a propellant fluid through a second conduit to the spray nozzle, atomizing the composition and propellant fluid in the nozzle to produce an aerosol that flows into the vessel and impregnates the support material present therein, heating the vessel so the liquid present in the aerosol (Continued)

evaporates from the support material and the finely divided support material which has been treated with catalytically active material and/or a precursor thereof is dried, and discharging the vaporized liquid from the vessel.

25 Claims, 2 Drawing Sheets

(51) Int. Cl.
B01J 37/00 (2006.01)
B01J 37/08 (2006.01)

(52) U.S. Cl.
CPC ....... *B01J 37/0211* (2013.01); *B01J 37/0223* (2013.01); *B01J 37/08* (2013.01)

(58) Field of Classification Search
CPC ........ B01J 35/008; B01J 37/08; B01F 3/0241; B01F 3/0249; B01F 3/06; B01F 13/022; B01F 13/0205; B01F 13/0244; B01F 13/0227; B01F 5/242; B05D 1/02; B05D 1/002; C23C 16/45563
USPC ......... 502/100; 427/212, 226, 228, 229–231, 427/233, 236, 248.1, 255.23; 366/101, 366/105–107, 131, 134, 135, 144; 428/402, 402.24, 403
See application file for complete search history.

(56) References Cited

U.S. PATENT DOCUMENTS

| | | | |
|---|---|---|---|
| 4,858,552 A | | 8/1989 | Glatt et al. |
| 5,498,590 A | | 3/1996 | Burmeister et al. |
| 6,524,381 B1 | * | 2/2003 | Phillips .................. C23C 14/50 106/403 |
| 6,603,038 B1 | | 8/2003 | Hagemeyer et al. |
| 2006/0165910 A1 | * | 7/2006 | Kodas ..................... B01J 23/42 427/446 |
| 2010/0266844 A1 | * | 10/2010 | Jensen ..................... B01J 3/008 428/402 |
| 2012/0263864 A1 | | 10/2012 | Waldron |
| 2015/0126361 A1 | | 5/2015 | Mestl et al. |

FOREIGN PATENT DOCUMENTS

| | | |
|---|---|---|
| CN | 102686203 A | 9/2012 |
| DE | 2814262 A1 | 10/1979 |
| DE | 19734974 A1 | 2/1999 |
| DE | 19734975 A1 | 3/1999 |
| DE | 10127232 A1 | 12/2002 |
| DE | 10233864 A1 | 7/2003 |
| DE | 102005038453 A1 | 2/2007 |
| DE | 102012008715 A1 | 11/2013 |
| EP | 0599193 A1 | 6/1994 |
| EP | 0672450 A1 | 9/1995 |
| EP | 2420317 A1 | 2/2012 |
| WO | 2008/145389 A2 | 12/2008 |
| WO | 2008/145390 A1 | 12/2008 |

OTHER PUBLICATIONS

English translation of International Search Report for International patent application No. PCT/EP2014/001005; mailing date Jul. 16, 2014.
German language Written Opinion of the International Search Authority for International patent application No. PCT/EP2014/001005.
English Translation of Written Opinion of the International Search Authority for International patent application No. PCT/EP2014/001005.
English translation of abstract of EP 2420317 (A1).
English translation of abstract of DE 19734975 (A1).
English translation of abstract of DE 10233864 (A1).
English translation of abstract of DE 10127232 (A1).
English translation of abstract of DE 102005038453 (A1).
English abstract of CN1033641A.
English abstract of CN1519057A.

* cited by examiner

METHOD AND DEVICE FOR PRODUCING SHELL CATALYSTS

CROSS REFERENCE TO RELATED APPLICATIONS

This application is a U.S. National Stage Entry of International Patent Application Serial Number PCT/EP2014/001005, filed Apr. 15, 2014, which claims priority to German patent application no. DE 102013006794.4 filed Apr. 19, 2013, the entire contents of both of which are incorporated herein by reference.

FIELD

The present invention relates to a process and an apparatus for producing coated catalysts. By this means, it is possible to carry out impregnations of support materials of varied shapes and produce coated catalysts having different penetration depths of catalytically active material into the supports.

BACKGROUND

Coated catalysts and various processes for producing them are known.

Usually, catalyst supports of various shapes are impregnated with a liquid composition which is enriched in a catalytically active material and/or a precursor thereof.

During impregnation of the catalyst supports with the liquid composition, the catalytically active components and/or the precursors thereof not only get onto the surface of the catalyst supports but also into fine channels of the porous structure of the support material. An example of an impregnation method is dry impregnation ("incipient wetness" method). Here, a porous support material is impregnated with a liquid composition which contains just that amount of liquid which corresponds at most to the total pore volume of the support material. After the liquid composition has been taken into the pores of the support material, the latter appears dry.

When reactants are used or when reaction products are produced, it is often impossible or barely possible for these to diffuse toward or away from the catalytically active component. Catalytically active components in narrow open pores of the support material in this case do not participate, or participate to only a limited extent, in the reaction or the long residence time in the pores resulting from diffusion induces undesirable secondary reactions. It is therefore desirable to deposit the costly active component as far as possible on the surface or in the vicinity of the surface of the support material, with, in the broader sense, a shell of active component consisting of only a few atomic layers being formed around the support material or in the uppermost layers of the support material or individual accumulations of particles of active component being formed on the surface or in the upper layers of the surface of the support material.

Various methods of producing coated catalysts are known from the literature. In typical spray impregnations, for example as described in EP 0 599 193 A1, catalyst supports are placed in a stirred vessel, mixed by rotation of the stirred vessel and sprayed with the impregnation solution in such a way that the liquid phase of the solution can evaporate quickly. In this way, relatively large batches of coated catalysts can be spray-impregnated with respectable uniformity.

Further methods of applying catalytically active species to a catalyst support are known from EP 2 420 317 A1, EP 0 672 450 A1, DE 28 14 262 A1, DE 197 34 974 A1 and DE 197 34 975 A1.

DE 102 33 864 A1 discloses a process and an apparatus for producing pulverulent products, in which liquid active materials are atomized and applied to a support material. Here, the active material is conveyed together with an atomization medium present under superatmospheric pressure in a liquid, supercritical or gaseous state in separate product streams to a multifluid nozzle and the atomization medium is subsequently depressurized and the active material is very finely atomized. The atomized active material is subsequently brought to a support material. The apparatus is proposed, in particular, for applications in food technology and pharmacy.

U.S. Pat. No. 4,858,552 A1 describes an apparatus for pelletizing particles. Here, a nozzle can be used for introducing a plurality of media into a fluidized bed. Not only liquid components but also gaseous components can be introduced into the nozzle so as to exit concentrically around a liquid stream and assist atomization of the liquid.

In the processes known hitherto for producing coated catalysts, precursor solutions consisting of only one metal component were generally used. When a plurality of metal components were necessary, a consecutive mode of operation was generally pursued; i.e. impregnation with the second component was carried out after impregnation with the first component. The use of multimetal precursor solutions was generally not possible because of the lack of stability of such solutions. Further deficiencies of previously known systems for spraying liquid compositions are the absence of preheating of the propellant gas and the absence of preheating of the composition to be sprayed. Likewise, little attention was paid to the widening of the spray jet when using an ultrasonic expansion nozzle, even though the use of such nozzles has been described in EP 0 599 193 A1.

BRIEF DESCRIPTION OF THE DRAWINGS

The present disclosure is described in detail below with reference to the attached drawing figures, wherein.

DETAILED DESCRIPTION

Figure 1:
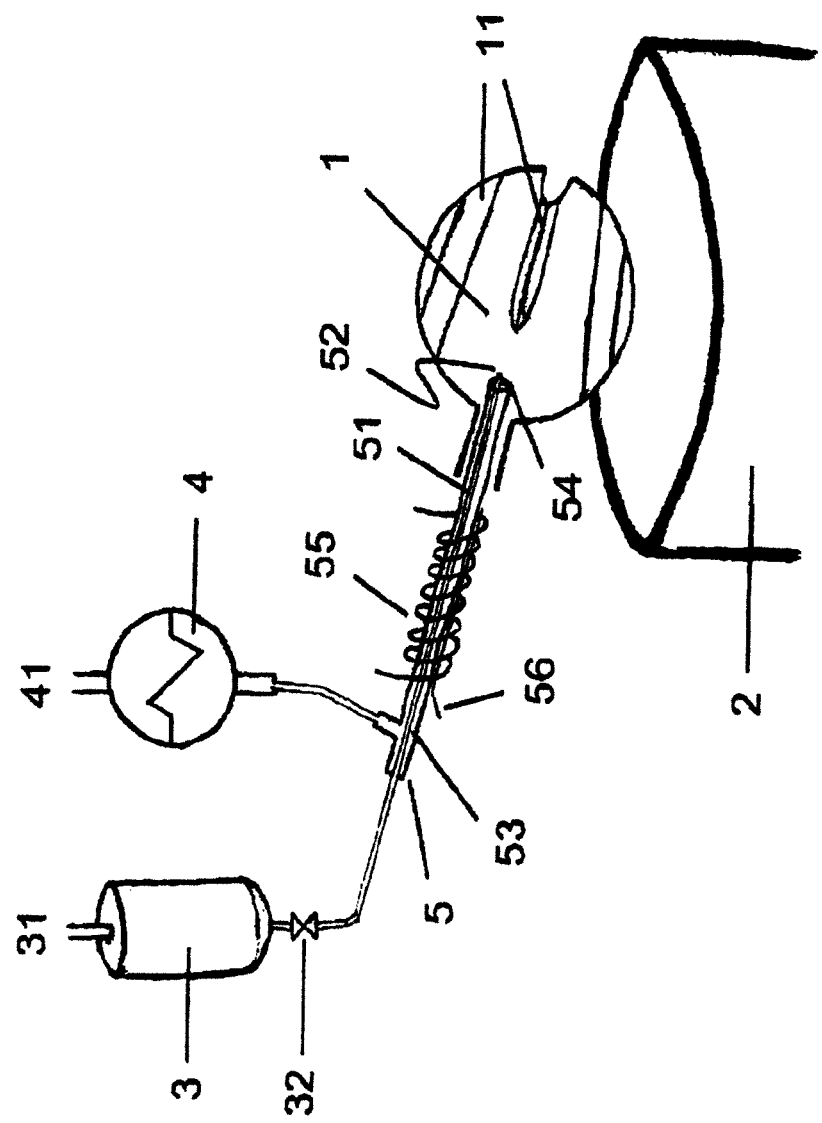
FIG. 1 is an isometric schematic view of an embodiment of a spray apparatus of the present disclosure.

One object of the present disclosure is the provision of an improved process and an improved apparatus for producing coated catalysts, by means of which the impregnation of support materials can be carried out in a more targeted manner, which are simple to realize and by means of which the consumption of catalytically active material can be significantly reduced.

In addition, spray processes for producing coated catalysts should be improved by means of the present invention so that reproducible application of liquid compositions containing catalytically active material and/or of precursors thereof is made possible, in particular when using metastable liquid compositions or liquid compositions having only a low stability, for example in the case of colloidal multimetal precursor solutions. Furthermore, a fine and very homogeneous distribution of catalytically active material on the catalyst supports should be achieved.

The present invention provides a process for producing coated catalysts, which comprises the measures:
 a) provision of a composition containing a liquid and a catalytically active material and/or a precursor thereof in a stock vessel,
 b) provision of a support material in a vessel which is rotatable about a longitudinal axis,
 c) transport of the composition from the stock vessel through a first conduit to a spray nozzle,
 d) transport of a propellant fluid through a second conduit to the spray nozzle,
 e) atomization of composition and propellant fluid in the nozzle to produce an aerosol which flows into the vessel and impregnates the support material present therein,
f) heating of the vessel (l) so that the liquid present in the aerosol evaporates from the support material and the finely divided support material which has been treated with catalytically active material and/or a precursor thereof is dried, and
g) discharge or extraction of the vaporized liquid from the vessel.

Any support materials suitable for producing coated catalysts can be used in the process of the invention. These support materials can have any shapes, for example be present as cylinder, cone, sphere, rotational ellipsoid, granular material or particles. The support materials can be compact bodies or preferably have a porous structure.

These support materials can consist of any materials as long as these are inert and stable under the conditions of the intended reaction. Examples of typical support materials are metal oxides such as $Al_2O_3$, $SiO_2$, $TiO_2$, ZnO, MgO, $SnO_2$, $CeO_2$, $Fe_2O_3$ or carbon, e.g. activated carbon or carbon black. It is also possible to use supports based on a spinel structure, for example $MgAl_2O_4$, $CaAl_2O_4$, $ZnAl_2O_4$ or $SnAl_2O_4$ or it is possible to use supports based on zeolites.

The support material in the vessel which is rotatable about a longitudinal axis can be an inorganic support material, in particular metal oxides, or carbon, e.g. activated carbon or carbon black.

In the process of the invention, it is possible to use any catalytically active materials suitable for producing coated catalysts and/or precursors thereof.

As catalytically active materials, it is possible to use any materials as long as these are inert under the conditions of the intended reaction and catalytically assist the course of this reaction.

Examples of catalytically active materials are metals, for example transition metals and in particular noble metals or compounds derived therefrom, e.g. oxides, halides or complexes. Noble metals or compounds derived therefrom, e.g. platinum metals, gold, silver or rhenium, and also Zn, Cu, Ni, Co and/or Fe, are typically used as catalytically active materials. For the purposes of the present invention, platinum metals are the metals ruthenium, rhodium, palladium, osmium, iridium and platinum.

The expression “precursors of catalytically active materials” is used to refer to compounds which can be converted by means of a chemical reaction, for example an oxidation reaction, into a catalytically active material. Examples of precursors of catalytically active materials are metal-organic complexes or metal compounds whose metal forms, when deposited on the support surface, the catalytically active component of the catalyst.

Examples of coated catalysts produced according to the invention are catalysts having various platinum and tin contents on a support material which has been provided.

A conventional way of producing such catalysts in the laboratory involves manual dribbling of hexachloroplatinate solutions and tin chloride solutions by means of a burette onto a weighed amount of support material. It has been found that impregnations using tin chloride-containing platinum complex salt solutions can be very problematical because of decomposition of the impregnation solution.

The impregnation method according to the invention enables considerable improvements to be achieved in catalyst production. The spray apparatus of the invention allows uniform application of the impregnation solution and, owing to the preheating of the carrier fluid, rapid evaporation of the solvent can occur. Sensitive catalyst systems can accordingly be dried very quickly. In addition, a defined coated catalyst can be produced without chemical pretreatment. The impregnation methodology which can be modified in a targeted manner opens very interesting possibilities for catalyst development.

The catalytically active substance is preferably homogeneously distributed on the coated catalyst produced according to the invention. In particular, the catalytically active substance is in the form of nanoparticulate clusters of metals or metal oxides. This homogeneous distribution on the support material is made possible by the inventive spray apparatus described below and is based essentially on the spraying of a stable liquid containing the catalytically active substance and/or precursors thereof. This liquid can be present in various forms. Thus, it can be, for example, a solution or a dispersion of a catalytically active compound and/or precursors thereof in a liquid.

Preference is given to a process in which the composition containing a liquid and a catalytically active material and/or a precursor thereof in the stock vessel is a solution or dispersion of a catalytically active material and/or a precursor thereof in the liquid. The solution or dispersion can be stirred in the stock vessel. Especially when a dispersion is to be conveyed out of the stock vessel, it can be advantageous for this to be stirred in the stock vessel.

For the purposes of the present description, colloids are particles or droplets which are finely dispersed in a liquid, viz. the dispersion medium. The individual colloid particles or droplets typically have a size in the range from 1 nm to 10 $\mu$m.

For the purposes of the present description, dispersions are heterogeneous compositions composed of solid catalytically active materials and/or precursors thereof in liquids, with the diameter of the materials and/or of the precursors typically being in the range from 1 nm to 100 $\mu$m.

Particular preference is given to using solutions, in particular those of one or more transition metals and/or precursors thereof. One of the advantages of the process of the invention is rapid evaporation of the mobile liquid phase and associated controlled agglomeration of the catalytically active material and/or precursor thereof to form clusters on the surface and/or in the layers of the support material close to the surface. This results in hindering of the penetration of the applied liquid into the deeper regions of the interior of the support material.

The extent of penetration of the liquid into the support material can be influenced by setting of the spraying conditions. Thus, for example, the liquid and/or the propellant fluid can be heated in order to bring about accelerated evaporation of the liquid after spraying. A concentrated fluid containing the catalytically active material and/or precursor thereof then impinges on the surface of the support material. The concentrated fluid can penetrate into the support material only with difficulty.

All fluids which are suitable for use in spray nozzles can be used as propellant fluid in the process of the invention. These can be basically liquids, gases or fluids in the supercritical state. Preference is given to using propellant gases, in particular inert gases, i.e. gases made up of components which do not undergo any chemical reactions with the other components of the mixture to be sprayed under the conditions of spraying. However, it is also possible to use reactive fluids. Examples of propellant fluids are air, nitrogen, argon and hydrocarbons which are gaseous under the spraying conditions.

Preference is given to a process in which an inert gas, for example nitrogen or argon, is used as spraying gas and is heated, for example to temperatures in the range from 30 to 90° C., before transport through the second conduit and/or during transport through the second conduit.

Preference is likewise given to a process in which the composition is heated, for example to temperatures in the range from 30 to 90° C., in the stock vessel.

Discharge of the composition from the stock vessel into the first conduit can be carried out in any way. Preference is given to a process in which the composition is pushed out of the stock vessel into the first conduit by introduction of a propellant gas into the stock vessel. As an alternative, transport of the composition from the stock vessel into the first conduit can also be effected by means of another conventional transport element, for example by means of a metering pump.

The two conduits to the spray nozzle can run separately from one another or they form one functional unit.

Preference is given to a process in which the first conduit runs within the second conduit and a concentric hollow space through which the propellant gas is supplied to the nozzle is formed between the outer wall of the first conduit and the interior wall of the second conduit.

Any spray nozzles can be used in the process of the invention.

One of the advantages of the process of the invention is that the surface area of the atomized aerosol to be applied to the support material can be increased in a targeted and controllable manner. This allows targeted introduction of energy into the aerosol (pressure drop). Enlargement of the surface area of the aerosol particles enables the evaporation rate of the liquid present in these particles to be influenced. Bringing about an increase in the evaporation rate would also be possible by means of other measures, for example by increasing the temperature of the aerosol particles. However, high temperatures are often unfavorable for thermally sensitive impregnation solutions, and the evaporation usually proceeds nonuniformly. Fine droplets (aerosols) are energetically unfavorable and become absorbed more readily on the support material and also evaporate more readily there.

Preference is given to using supersonic nozzles. These are, for the purposes of the present invention, nozzles which accelerate the medium flowing through the nozzle to supersonic velocity on exit from the nozzle. In principle, all supersonic nozzles are preferred for carrying out the process of the invention. Particular preference is given to using Laval nozzles or Venturi nozzles which accelerate the medium flowing through the nozzle to supersonic velocity on exit from the nozzle. These nozzles are referred to as supersonic Venturi nozzles or supersonic Laval nozzles.

It is in principle also possible to use nozzles which are operated at sonic velocity or subsonic velocity.

Particular preference is given to using ultrasonic expansion nozzles having the shape of a single-surface hyperboloid which is given by the Euclidic standard shape $$(x/a)^2+(y/b)^2-(z/c)^2=1$$

where a, b and c are real numbers greater than zero, a=b and a/c is greater than one, and x, y and z are the coordinates of the nozzle surface in space.

Such a design makes particularly uniform application of the solution or dispersion over a large area onto the support material possible.

The rotatable vessel used in the process of the invention can have any shapes and can consist of any materials as long as these are compatible with the components for producing the coated catalyst. The vessel preferably consists of metal, glass or ceramic. The vessel is preferably rotationally symmetric. The axis of rotation of the vessel runs in its longitudinal direction through the opening into which the spray nozzle opens. The axis of rotation of the vessel particularly preferably runs in the position of the rotational axis of the rotational body.

In a preferred embodiment of the process of the invention, the axis of rotation of the rotatable vessel runs in the longitudinal direction of this vessel and is inclined to the horizontal by an angle of from 50° to 90°, in particular from 70° to 80°.

The rotatable vessel can have an empty interior space with smooth walls. Functional internals which serve for mixing the finely divided support material are preferably present in the interior of the rotatable vessel, especially lamellae projecting into the interior of the vessel. These "chicanes" aid mixing of the material present in the interior of the vessel.

After impregnation of the support material and removal of the liquid, the impregnated and dried support material is unloaded from the rotatable vessel.

The impregnated and dried material removed from the vessel is subjected to calcination. Here, any precursor substances present are converted into catalytically active materials and catalytically active materials are conditioned on or in the support. Typical temperatures for the calcination step depend on the catalyst system. Calcination temperatures are, by way of example, from 500 to 900° C.

The drying and calcination of the catalyst may optionally be followed by washing in order to remove undesirable constituents formed during calcination, for example halides. This can be followed by a secondary drying and a secondary calcination.

A particularly preferred variant of the process of the invention comprises the following measures:
  i) provision of a solution or dispersion of a catalytically active material and/or a precursor thereof in a liquid, which is initially placed in a stock vessel (3),
  ii) provision of a finely divided support material in a vessel (1) which is rotatable about a longitudinal axis,
  iii) introduction of inert gas (31) into the stock vessel (3) so that the solution or dispersion present therein is conveyed into an inner capillary (51) and at its end (52) enters a supersonic expansion nozzle (54),
  iv) introduction of propellant fluid (41) into an outer capillary (53) in which the inner capillary (51) runs so as to define a concentric hollow space through the two capillaries (51, 53) in which the propellant fluid (41) moves and at the outlet end of which the propellant fluid (41) enters the supersonic expansion nozzle (54),
  v) atomization of the propellant fluid (41) and the solution or dispersion in the supersonic expansion nozzle (54)

so as to produce an aerosol which flows into the vessel (1), with widening of the jet of the aerosol occurring, vi) contacting of the aerosol with the finely divided support material in the vessel (1) so that the aerosol impregnates the finely divided support material and the aerosol deposits on the surface and/or in layers close to the surface of the finely divided support material, vii) heating of the vessel (1) so that the liquid present in the aerosol evaporates from the finely divided support material and viii) discharge or extraction of the vaporized liquid from the vessel (1).

On impregnation of the finely divided support material with the aerosol in layers close to the surface, it is possible to realize, for example, penetration depths of up to 1 mm, for example penetration depths of from 0.5 mm to 1 mm.

In a preferred variant of the apparatus of the invention, the stock vessel (3) is equipped with a stirring device.

In a further particularly preferred variant of the process of the invention, the propellant fluid and/or the composition in the stock vessel is heated to such a temperature that part of the liquid present in the aerosol evaporates in the vessel even before impingement of the aerosol on the support material, so that the penetration depth of the aerosol into the support material can be set in a targeted manner.

In a further preferred variant of the process of the invention, the rotatable vessel rotates continuously about an axis running in the longitudinal direction of the spray nozzle, in particular about a rotational axis running in the longitudinal direction of the spray nozzle, preferably at a rotational speed $v=3-300$ min$^{-1}$, particularly preferably at a rotational speed of $v=10-30$ min$^{-1}$.

A further particularly preferred variant of the process of the invention involves setting of the spraying rate $d/dt$ $m_s = \dot{m}_s$ for the composition comprising the liquid and the catalytically active material and/or a precursor thereof in such a way that a functional relationship is established between spraying rate $\dot{m}_s$ and evaporation rate $d/dt$ $m_v = \dot{m}_v$ of the liquid, where $\dot{m}_s = a \cdot \dot{m}_v$ and $0.5 < a < 3.5$, preferably $0.13 < a < 2.0$, particularly preferably $0.9 < a < 1.0$.

The process of the invention allows
- the impregnation of catalyst supports of differing shape and comprising differing materials,
- the use of a liquid impregnation composition which is optionally preheated and contains one or more catalytically active materials even in the form of a precursor thereof and optionally further additives, for example acids, bases or buffer substances as pH regulators (buffers), or immobilizers for active components which have previously been deposited on the support,
- the separate application of liquid impregnation compositions of differing composition by separate spraying,
- the use of a rotatable vessel which is tilted about the height axis (e.g. a glass flask) having chicane walls which performs a continuous rotary motion about its longitudinal axis, and
- the use of a spray nozzle which is supplied with a liquid impregnation composition which is conveyed under slightly superatmospheric pressure through a capillary system to the spray head and there exits in a constant mass stream and is atomized together with an optionally preheated carrier fluid by the shaping-related supersonic expansion nozzle at the end of the capillary to give a spray mist having a large widening of the jet.

The invention also provides an apparatus for applying a catalytically active material and/or a precursor thereof to support material. The apparatus is characterized by the presence of the following elements:

A) stock vessel for a composition containing a liquid and a catalytically active material and/or a precursor thereof,
B) vessel which is rotatable about a longitudinal axis for a support material,
C) spray nozzle which opens into the rotatable vessel,
D) first conduit which is arranged between stock vessel and spray nozzle and serves for transport of the composition from the stock vessel to the spray nozzle, and
E) second conduit which serves for transport of a propellant fluid to the spray nozzle.

In a preferred variant of the apparatus of the invention, the stock vessel and rotatable vessel are equipped with heating devices.

In a further preferred variant of the apparatus of the invention, a stock vessel equipped with a heating device is provided for a propellant fluid and is connected to the second conduit and/or the second conduit is equipped with a heating device.

A further preferred variant of the apparatus of the invention is characterized in that the first conduit runs within the second conduit so that a concentric hollow space is formed between the exterior wall of the first conduit and the interior wall of the second conduit. Here, the concentric hollow space preferably has a gap diameter which, at a given gas admission pressure, increases the flow velocity of the propellant fluid flowing in the hollow space by a multiple and the end of the second conduit which points in the direction of the rotatable vessel has a logarithmic opening so as to form a supersonic expansion nozzle.

In a particularly preferred embodiment of the apparatus of the invention, a first conduit runs within a second conduit so that a concentric hollow space is formed between the exterior wall of the first conduit and the interior wall of the second conduit, the end of the first conduit which opens in the direction of the vessel is movable in the direction of the longitudinal axis and the exterior wall of the second conduit is widened at the end opening in the direction of the vessel so that a nozzle is formed and the liquid stream exiting from the end of the first conduit is widened and sprayed.

Further preferred apparatuses according to the invention are characterized in that the nozzle is a supersonic expansion nozzle, preferably a Laval nozzle or a Venturi nozzle.

Even further preferred apparatuses according to the invention are characterized in that the rotatable vessel has an axis of rotation which runs in the longitudinal direction of the vessel and is inclined to the horizontal by an angle of from 50° to 90°, preferably from 70° to 80°, with functional internals which serve for mixing of the finely divided support material preferably being present in the interior of the rotatable vessel, especially lamellae projecting into the interior of the vessel.

The present disclosure is discussed in further detail below with reference to the attached drawing figures representing various embodiments of the concepts disclosed herein.

FIG. 1 shows a heated stock vessel (3) for the solution or dispersion of the precursor of the catalytically active substance, which is supplied to a spray head (5). This solution or dispersion is pushed by means of an inert gas (31) through a first conduit or through an inner capillary (51) and exits at the outlet opening (52), which opens into a spray nozzle, e.g. a supersonic expansion nozzle (54), into a glass flask (1). The transport of the solution or dispersion through the inner capillary (51) is assisted by an inert gas (41) which has been preheated in a gas preheating device (4) and has been introduced into a concentric second conduit or an outer capillary (53) Inner and outer capillaries (51, 53) can be heated by means of a heating coil (55). The temperature can be determined by means of a thermocouple (56). Inert gas (41) leaves the concentric outer capillary (53) and flows together with the solution or dispersion through the spray nozzle (54). The stream exiting at the spray nozzle (54) is atomized and is, as a result of the logarithmic shaping of the spray nozzle (54), forced to undergo a large widening of the jet and a more homogeneous distribution associated therewith. The jet widening and spraying rate can be adjusted variably by setting of the pressure of the inert gas (41) and also the relative lateral shift $\underline{\Delta d}$ of the outlet opening (52) and the supersonic expansion nozzle (54). The glass flask (1) is driven by a rotation-regulated motor, for example at speeds of rotation in the range from 15 to 300 $min^{-1}$. In the examples of spray impregnation described below, a speed of rotation of 20 $min^{-1}$ was employed. To effect better mixing, the glass flask (1) was equipped with chicanes (11) at the walls and on the bottom. In addition, the glass flask (1) was tilted by 75° relative to the height axis. To effect rapid evaporation of the solvent of the impregnation solution, which is characterized by the boiling point $T_s$, the flask was maintained at a temperature of $T\sim 0.9\,T_s$ in a water or oil bath (2).

Figure 2:
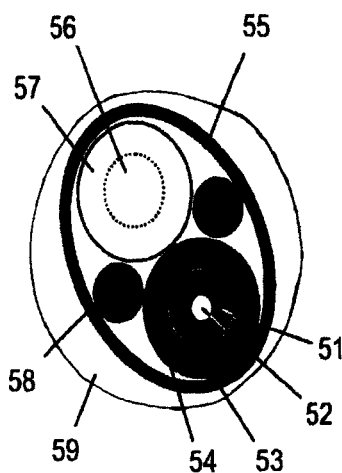
FIG. 2 is a schematic view of an embodiment of a spray head of the present disclosure.

FIG. 2 shows a front view of the spray head (5) in perspective view. The inner capillary (51) with outlet opening (52) and the outer capillary (53) which forms the supersonic expansion nozzle (54) are shown. These elements are surrounded by the heating device (55). The heating device (55) additionally comprises a guide tube (57) for a thermocouple (56). In addition, a heating rod (58) is present; this is optionally provided for the case in which the heating device (55) is not continued to the nozzle (54). The spray head (5) is also sheathed with insulation (59).

Figure 3:
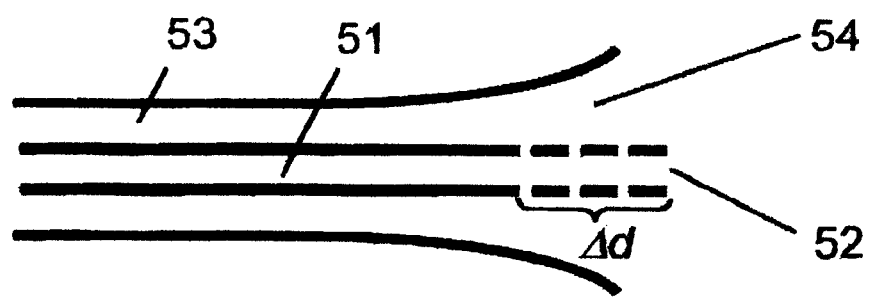
FIG. 3 is a side cross-section view of an embodiment of a spray head of the present disclosure.

FIG. 3 shows a side view of the spray head (5) in section. The inner capillary (51) with outlet opening (52), the concentric outer capillary (53) and the supersonic expansion nozzle (54) which is formed by widening of the outer capillary (53) in the vicinity of the outlet opening (52) are shown. The outer capillary (53) ideally opens in a logarithmic function. At the right-hand end of the inner capillary (51), it is indicated by broken lines that the outlet opening (52) can be shifted by the distance $\Delta d$.

The following examples illustrate the invention without limiting it. The spraying tests described in the examples were carried out using the apparatus described in FIGS. 1-3.

Example 1

The temperature of the support material to be impregnated in the flask (1) was 82° C. The aqueous, colored impregnation solution was heated in the inner capillary (51) of the spray nozzle to 95° C. The admission pressure of the argon gas stream of 2.0 bar at 250° C. in the concentric capillary (53) sprayed the solution at a volume flow of 1.1 ml/min. This resulted in a penetration depth of the impregnation solution of about 0.05 mm into the support material. The amount of solution corresponded to the uptake capacity of the support. After conclusion of the spraying process, it took about 1 minute for the now slightly adhering, impregnated support to become free-flowing.

Example 2

The temperature of the support material to be impregnated in the flask (1) was 84° C. The noble metal salt-containing impregnation solution was heated to 82° C. in the inner capillary (51) of the spray nozzle. The admission pressure of the argon gas stream of 2.0 bar at 250° C. in the concentric capillary (53) sprayed the impregnation solution at a volume flow of 1.6 ml/min. This resulted in a penetration depth of the impregnation solution of about 0.1 mm into the support material. The amount of solution corresponded to the uptake capacity of the support. After conclusion of the spraying process, it took about 3.5 minutes for the now slightly adhering, impregnated support to become free-flowing.

Example 3

The temperature of the support material to be impregnated in the flask (1) was 81° C. The bimetal salt-containing impregnation solution having a higher viscosity compared to Example 2 was heated to 82° C. in the inner capillary (51) of the spray nozzle. The admission pressure of the argon gas stream of 2.0 bar at 250° C. in the concentric capillary (53) sprayed the impregnation solution at a volume flow of 2.5 ml/min. This resulted in a penetration depth of the impregnation solution of about 0.6 mm into the support material. The amount of solution corresponded to the uptake capacity of the support. After conclusion of the spraying process, it took about 4.5 minutes for the now slightly adhering, impregnated support to become free-flowing.

The argon gas stream used in these examples in the concentric capillary (53) sprayed the liquid exiting from the inner capillary (51) at a defined volume flow. The ratio of the gas flow to the liquid volume flow is important for determining the droplet size. The exiting gas flow is determined by the argon admission pressure. The liquid flow can be set by means of a gas pressure on the stock vessel (3) or, for example, also by means of a metering pump. The spacing between outlet opening (52) of the inner capillary (51) and the supersonic expansion nozzle (54) is likewise critical in determining the droplet size.

The invention claimed is:
1. A process for producing coated catalysts, comprising:
 a) providing a composition containing a liquid and at least one of a catalytically active material or a precursor thereof in a stock vessel;
 b) providing a support material in a vessel which is rotatable about a longitudinal axis;
 c) transporting the composition from the stock vessel through a first conduit to a spray nozzle;
 d) transporting a propellant fluid through a second conduit to the spray nozzle;
 e) atomizing the composition and propellant fluid in the nozzle to produce an aerosol which flows into the vessel and impregnates the support material present therein;
f) heating the vessel so that the liquid present in the aerosol evaporates from the support material and the support material which has been treated with catalytically active material and/or a precursor thereof is dried; and
g) at least one of discharging or extracting the vaporized liquid from the vessel.

2. The process of claim 1, wherein the spraying fluid is an inert gas which is heated before transport through the second conduit and/or during transport through the second conduit.

3. The process of claim 1, wherein the composition containing a liquid and a catalytically active material and/or a precursor thereof is heated in the stock vessel.

4. The process of claim 1, wherein the composition containing a liquid and a catalytically active material and/or a precursor thereof is pushed from the stock vessel into the first conduit by introduction of a propellant fluid into the stock vessel or by means of a metering pump.

5. The process of claim 1, wherein the composition containing a liquid and a catalytically active material and/or a precursor thereof in the stock vessel is a solution or dispersion of a catalytically active material and/or a precursor thereof in the liquid, where the solution can be stirred in the stock vessel.

6. The process of claim 1, wherein the first conduit runs within the second conduit and a concentric hollow space through which the propellant fluid is supplied to the nozzle is formed between the exterior wall of the first conduit and the interior wall of the second conduit.

7. The process of claim 1, wherein the nozzle is a supersonic expansion nozzle.

8. The process of claim 1, wherein the support material in the rotatably mounted vessel is an inorganic support material.

9. The process of claim 1, wherein the axis of rotation of the rotatable vessel runs in the longitudinal direction of this vessel and is inclined from the horizontal by an angle of from 20° to 75°.

10. The process of claim 1, wherein functional internals which serve for mixing of the support material are present in the interior of the rotatable vessel.

11. The process of claim 1, wherein the impregnated support material is taken from the vessel after evaporation of the liquid and is subjected to calcination at temperatures of from 500 to 900° C.

12. A process for producing coated catalysts, comprising:
i) providing at least one of a solution or dispersion of at least one of a catalytically active material or a precursor thereof in a liquid, which is initially placed in a stock vessel;
ii) providing a support material in a vessel which is rotatable about a longitudinal axis;
iii) introducing an inert gas into the stock vessel so that the solution or dispersion present therein is conveyed into an inner capillary and at its end enters a supersonic expansion nozzle;
iv) introducing a propellant fluid into an outer capillary in which the inner capillary runs so as to define a concentric hollow space through the two capillaries in which the propellant fluid moves and at the outlet end of which the propellant fluid enters the supersonic expansion nozzle;
v) atomizing the propellant fluid and the solution or dispersion in the supersonic expansion nozzle so as to produce an aerosol which flows into the vessel, with widening of the jet of the aerosol occurring;
vi) contacting the aerosol with the support material in the vessel so that the aerosol impregnates the support material and the aerosol deposits on the surface and/or in layers close to the surface of the support material;
vii) heating of the vessel so that the liquid present in the aerosol evaporates from the support material; and
viii) at least one of discharging or extracting the vaporized liquid from the vessel.

13. The process of claim 12, wherein at least one of the propellant fluid or the composition in the stock vessel are heated to such a temperature that part of the liquid present in the aerosol evaporates in the vessel even before impingement of the aerosol onto the support material, so that the penetration depth of the aerosol into the support material can be set in a targeted manner.

14. The process of claim 1, wherein the rotatable vessel rotates continuously about an axis running in the longitudinal direction of the spray nozzle at a rotational speed $v=3-300$ min$^{-1}$.

15. The process of claim 1, wherein the spraying rate d/dt $m_s = \dot{m}_s$ for the composition containing the liquid and the catalytically active material and/or a precursor thereof is set so that a functional relationship is established between spraying rate $\dot{m}_s$ and evaporation rate d/dt $m_v = \dot{m}_v$ of the liquid, where $\dot{m}_s = a \cdot \dot{m}_v$ and $0.5 < a < 3.5$.

16. An apparatus for applying a catalytically active material and/or a precursor thereof to support material, which contains the following elements:
A) stock vessel for a composition containing a liquid and a catalytically active material and/or a precursor thereof;
B) vessel which is rotatable about a longitudinal axis for a support material;
C) spray nozzle which opens into the rotatable vessel;
D) first conduit which is arranged between stock vessel and spray nozzle and serves for transport of the composition from the stock vessel to the spray nozzle; and
E) second conduit which serves for transport of a propellant fluid to the spray nozzle.

17. The apparatus of claim 16, wherein the stock vessel is equipped with a stirring device.

18. The apparatus of claim 16, wherein the stock vessel and the rotatable vessel are equipped with heating devices.

19. The apparatus of claim 16, wherein a stock vessel equipped with a heating device is provided for a propellant fluid and is connected to the second conduit and/or in that the second conduit is equipped with a heating device.

20. The apparatus of claim 16, wherein the first conduit runs within the second conduit so that a concentric hollow space is formed between the exterior wall of the first conduit and the interior wall of the second conduit.

21. The apparatus of claim 20, wherein the concentric hollow space has a gap diameter which at a given gas admission pressure increases the flow velocity of the propellant fluid flowing in the hollow space by a multiple and in that the end of the second conduit which points in the direction of the rotatable vessel has a logarithmic opening so that a supersonic nozzle is formed.

22. The apparatus of claim 16, wherein the nozzle is a supersonic nozzle.

23. The apparatus of claim 20, wherein the end of the first conduit which opens in the direction of the vessel is movable in the direction of the longitudinal axis and in that the exterior wall of the second conduit is widened at the end opening in the direction of the vessel so that a nozzle in which the liquid stream exiting from the end of the first conduit is widened and sprayed is formed.

24. The apparatus of claim 16, wherein the rotatable vessel has an axis of rotation running in the longitudinal direction of the vessel which is inclined to the horizontal by an angle of from 50° to 90°.

25. The apparatus of claim 16, wherein functional internals which serve for mixing of the support material are present in the interior of the rotatable vessel.

* * * * *